D. H. CHRISTMAN.
REFLUX CONDENSING DOME.
APPLICATION FILED FEB. 2, 1911.
1,009,049.
Patented Nov. 21, 1911.
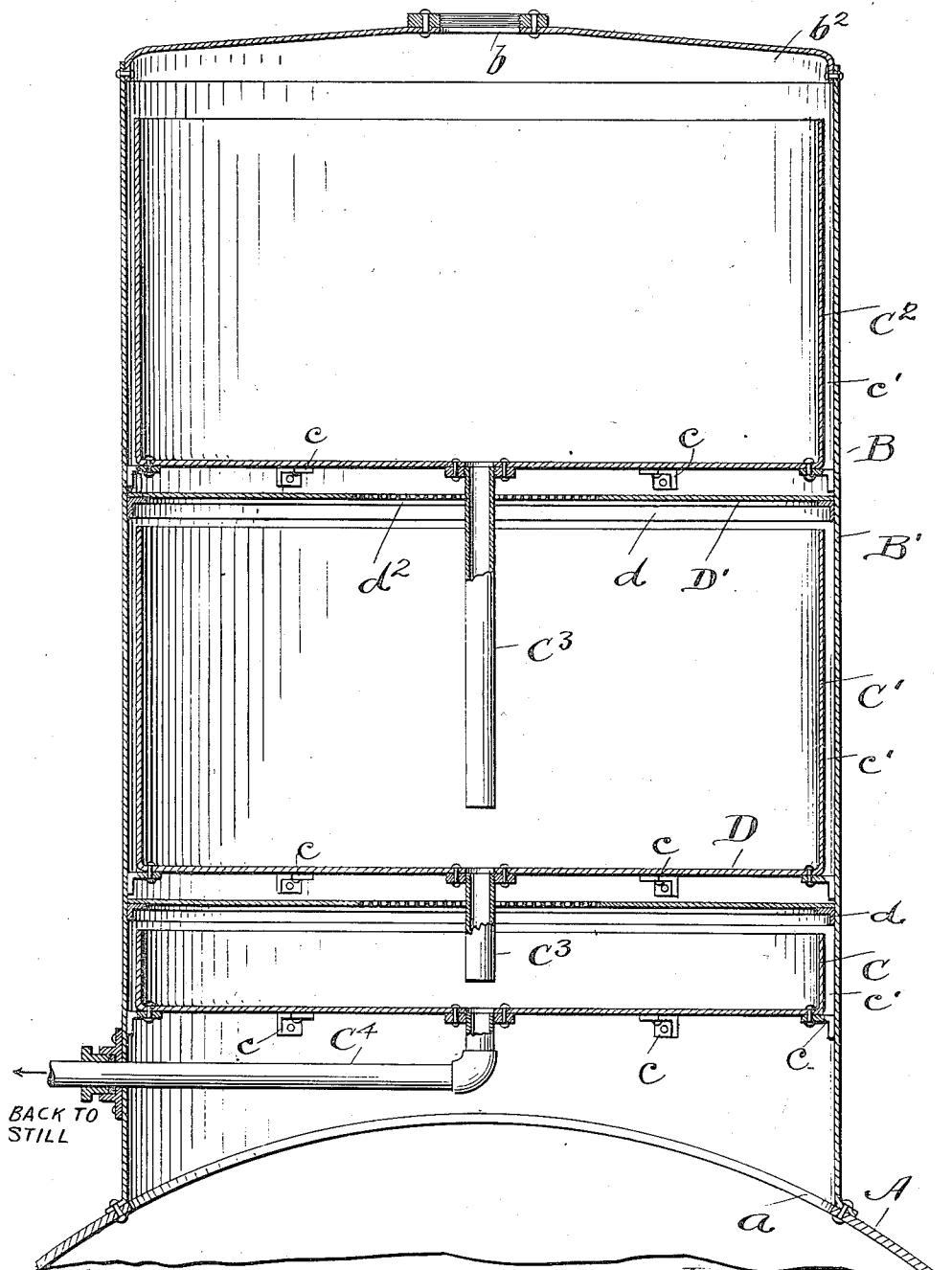

UNITED STATES PATENT OFFICE.

DANIEL H. CHRISTMAN, OF MARIETTA, OHIO, ASSIGNOR OF ONE-FOURTH TO W. C. McCLURE, OF CLEVELAND, OHIO, AND ONE-FOURTH TO R. H. COLE, OF MARIETTA, OHIO.

REFLUX CONDENSING-DOME.

1,009,049.

Specification of Letters Patent. Patented Nov. 21, 1911.

Application filed February 2, 1911. Serial No. 606,088.

*To all whom it may concern:*

Be it known that I, DANIEL H. CHRISTMAN, a citizen of the United States, residing at Marietta, in the county of Washington and State of Ohio, have invented a certain new and useful Improvement in Reflux Condensing-Domes, of which the following is a full, clear, and exact description.

This invention relates to improvements in reflux condensing domes such as are used on various kinds of stills employed in the distillation of substances such as petroleum and coal tar products. The invention is, however, primarily intended for use on the different forms of petroleum stills such as crude, steam, rerunning or reducing stills.

The object of the invention is to provide a reflux condensing dome which is more efficient and economical than those which have been used heretofore and which yields a larger percentage of distillates or which yields distillates of better quality or more desirable characteristics.

The dome constructed in accordance with my invention is designed particularly for producing a better and more thorough condensation of the heavier vapors which are evolved by the heat applied to the still, before the vapors pass into the condensing coil, and this is accomplished in the preferred form of my invention by providing in the shell of the dome a series of superimposed and alternately arranged pans and baffle plates, the pans being spaced slightly from the wall of the shell so that the vapors in rising must pass between the sides of the pans and the shell of the dome, and the baffle plates fitting closely the interior of the shell and being provided at and around the center thereof with perforations, with the result that the vapors in passing from the still to the top of the dome are brought alternately into engagement with the side wall of the dome and with the surfaces of the baffle plates, causing the heavier vapors to be condensed largely on the shell of the dome and partly on the flat surfaces of the baffle plates and pan bottoms. Further, the pans above the lowermost pan are provided with short outlet or drain pipes each emptying into the pan below and the lowermost pan is provided with a reflux pipe which is designed to be connected with the still, with the result that all the vapors condensed in the various parts of the dome are collected in the lowermost pan and thence pass again to the still by the reflux pipe.

My invention may be further briefly summarized as consisting in certain novel details of construction and combinations and arrangements of parts which will be described in the specification and set forth in the appended claims.

In the drawings I have shown in vertical section a portion of a still and my improved dome connected to the top thereof.

The still A may be of any form or construction, but as here shown is of the cylindrical type. Secured to the top of the still is the dome B comprising an upright cylindrical shell B′ which at the bottom is in open communication with the still through a large opening $a$ and at the top has a smaller opening and pipe connection $b$ for the egress of the vapors. The dome is designed to be connected at the opening $b$ with the usual condensing coil which need not be shown, as it forms no part of the present invention. The dome is provided on the interior with a series of superimposed pans C C′ and C² and baffle plates D and D′ which are arranged between or alternately with respect to the pans. In this case, I have provided three pans and two baffle plates, as I find that this number produces excellent results, but it will be understood that if circumstances require, the number may be varied from that shown. The pans are each supported on the inner wall of the shell by a series of angularly spaced lugs $c$ which may, if desired, be in the form of short angle sections with the pans resting on the horizontal flanges thereof, and each of the pans is separated slightly from the shell, leaving between the shell and the vertical cylindrical side walls of the pans annular vertical passageways $c'$. Each of the two upper pans C′ has an opening in the middle thereof and a short depending pipe section $c^3$ so that the condensed vapors collected in either of said pans may pass directly to the pan beneath, and the lowermost pan C has connected to the center thereof, a reflux pipe $C^4$ which passes outwardly through the shell of the dome near the bottom thereof and is designed to be connected in the usual manner with the still A. This reflux pipe may be provided with the customary "look box," or sight opening, which is not shown as its use and purpose are well known.

The baffle plates D and D' each fit closely within the shell of the dome and each is preferably supported upon an angle iron $d$ which extends entirely around the dome. Also these baffle plates are provided at or around the center with perforations $d^2$ through which the vapors are designed to pass.

It will be seen that the vapors rising from the still A must pass upwardly between the shell and the side of the lowermost pan C, and thence inwardly toward the center of the dome and upwardly through the central perforations of the lowermost baffle plate D; thence outwardly between the baffle plate D and the bottom of the middle pan C'; thence upwardly between the shell and the side of the middle pan; thence again inwardly and through the central peripheries of the uppermost baffle plate D; thence outwardly between the baffle plate D and the bottom of the uppermost pan $C^2$; and thence upwardly between the shell and the side of the pan $C^2$ into the open space $b^2$ at the top of the dome. From this space the lighter vapors which have not condensed pass to the condensing coil. With this construction the vapors have a circuitous path and are brought alternately against the surface of the shell of the dome and into engagement with the baffle plates and bottom portions of the pans.

The result of this construction is that the heavier vapors evolved at any time or corresponding to a given temperature in the still are condensed largely on the shell of the dome, and also to some extent upon the baffle plates and bottom portions of the pans. The lowermost pan C is made much shallower than the other pans and any of the vapors which are condensed between the shell and the side of this pan pass directly to the still, but only a very small percentage of the vapors are condensed at this point. The vapors which are condensed beyond this point are collected in the several pans and the condensed vapors which collect in the two uppermost pans pass by way of the short pipes $c^3$ to the lowermost pan C from which they are returned to the still by the reflux pipe $C^4$. It will be noted that the return of the distillates to the still does not interfere with the rising vapors and vice versa.

I have found that with the dome constructed as above described, a much better condensation of the heavier vapors and separation from the lighter vapors takes place while obtaining all the different grades of distillates, than with the domes which have been used heretofore, and careful tests have proven the dome to have the following advantages: First: The condenser coil is left more free of gummy paraffin products or sticky distillates, and a smaller quantity of crude gasolene is required to flush the condensing coil free from all such gummy substances. Second: A larger percentage of light-gravity gasolene practically free from kerosene distillates is obtained, the gasolene after the first few barrels being water-white in color. Third: Light gravity kerosene distillate which is of water white color, and which complies with any desired State specifications for flash test, can be obtained. Fourth: It produces a very light colored wax distillate, crystalline in form, which can be cold filtered without the necessity for being first redistilled. In this manner a larger percentage of high viscosity lubricating oil is produced than that produced from a re-run distillate.

Having thus described my invention, what I claim is:

1. In combination with a still, a reflux condensing dome seated on and in open communication with the top of the still and comprising a shell provided on the interior with a series of alternately arranged superimposed pans and baffle plates, the sides of the pans being spaced from the shell, and the baffle plates having passageways near the middle portions thereof, the lowermost pan having a reflux pipe connected thereto and each of the remaining pans having a drain which empties into the pan beneath.

2. In combination with a still, a reflux condensing dome seated on and in direct open communication with the top of the still and comprising a shell provided on the interior with a series of alternately arranged superimposed pans and baffle plates, the pans having side walls spaced from the wall of the shell and the baffle plates having central perforations, the lowermost pan having a reflux pipe connected to the bottom thereof and the other pans having drain pipes extending downwardly therefrom through the adjacent baffle plates.

3. In combination with a still, a dome seated on the top thereof and comprising a shell in open communication at its bottom with the still and at its top having an egress opening for vapors, said shell having on the interior a series of superimposed and alternately arranged pans and baffle plates supported from the shell, the pans having upright side walls concentrically arranged with respect to the shell and spaced therefrom, and the baffle plates having passageways arranged at the middle portions thereof, the lowermost pan having a reflux pipe connected thereto and each of the remaining pans having a drain which empties into the pan beneath.

In testimony whereof, I hereunto affix my signature in the presence of two witnesses.

DANIEL H. CHRISTMAN.

Witnesses:
 HARRY S. DYAR,
 CHARLES W. RICHARDS.